United States Patent
Garg et al.

(10) Patent No.: US 8,619,702 B2
(45) Date of Patent: Dec. 31, 2013

(54) RADIO NETWORK CONTROL

(75) Inventors: Deepak Garg, Nashua, NH (US);
Prasasth R. Palnati, Westford, MA (US)

(73) Assignee: Ericsson Evdo Inc., Dover, DE (US)

( * ) Notice: Subject to any disclaimer, the term of this patent is extended or adjusted under 35 U.S.C. 154(b) by 1371 days.

(21) Appl. No.: 11/305,286

(22) Filed: Dec. 16, 2005

(65) Prior Publication Data

US 2007/0140172 A1    Jun. 21, 2007

(51) Int. Cl.
*H04W 4/00*    (2009.01)
*H04W 36/00*    (2009.01)

(52) U.S. Cl.
USPC .......................................... 370/331; 455/439

(58) Field of Classification Search
USPC .................................. 370/331; 455/436–444
See application file for complete search history.

(56) References Cited

U.S. PATENT DOCUMENTS

| | | |
|---|---|---|
| 5,128,938 A | 7/1992 | Borras |
| 5,239,675 A | 8/1993 | Dudczak |
| 5,377,224 A | 12/1994 | Hudson |
| 5,574,996 A | 11/1996 | Raith |
| 5,754,945 A | 5/1998 | Lin et al. |
| 5,790,528 A | 8/1998 | Muszynski |
| 5,815,813 A | 9/1998 | Faruque |
| 5,828,661 A | 10/1998 | Weaver et al. |
| 5,852,630 A | 12/1998 | Langberg et al. |
| 5,857,154 A | 1/1999 | Laborde et al. |
| 5,884,177 A | 3/1999 | Hanley |
| 5,930,714 A | 7/1999 | Abu-Amara et al. |
| 5,937,345 A | 8/1999 | McGowan et al. |
| 5,940,762 A | 8/1999 | Lee et al. |
| 5,960,349 A | 9/1999 | Chheda |
| 5,974,318 A | 10/1999 | Satarasinghe |

(Continued)

FOREIGN PATENT DOCUMENTS

| | | |
|---|---|---|
| AU | 1998/72855 | 12/1998 |
| AU | 1998/84574 | 2/1999 |

(Continued)

OTHER PUBLICATIONS

Paul Bender, et al., "CDMA/HDR: A Bandwidth-Efficient High-Speed Wireless Data Service for Nomadic Users", IEEE Communications Magazine, Jul. 2000.

(Continued)

*Primary Examiner* — Steven Lim
(74) *Attorney, Agent, or Firm* — Ericsson Evdo Inc.

(57) ABSTRACT

The radio node controller of one subnet sends a communication to an access terminal over a control channel through the infrastructure of another subnet. The radio node controller maintains an open traffic channel with an access terminal when the access terminal moves from a coverage area of the first subnet to a coverage area of the second subnet and when the access terminal uses a carrier in the first subnet that cannot be used in the second subnet. In a radio access network including a first and a second subnet, in which the first subnet includes both a first radio node controller and radio nodes that are configured in accordance with one 1xEV-DO standard and the second subnet includes radio nodes configured in accordance with another 1xEV-DO standard, the first radio node controller maintains an open traffic channel with an access terminal when the access terminal moves from the coverage area of the first subnet to the coverage area of the second subnet.

58 Claims, 3 Drawing Sheets

(56) References Cited

U.S. PATENT DOCUMENTS

| | | |
|---|---|---|
| 5,983,282 A | 11/1999 | Yucebay |
| 5,991,635 A | 11/1999 | Dent et al. |
| 6,011,970 A | 1/2000 | McCarthy |
| 6,014,564 A | 1/2000 | Donis et al. |
| 6,016,429 A | 1/2000 | Khafizov et al. |
| 6,023,625 A | 2/2000 | Myers |
| 6,032,033 A | 2/2000 | Morris et al. |
| 6,047,186 A | 4/2000 | Yu et al. |
| 6,049,715 A | 4/2000 | Willhoff et al. |
| 6,052,594 A | 4/2000 | Chuang et al. |
| 6,061,560 A | 5/2000 | Saboorian et al. |
| 6,069,871 A | 5/2000 | Sharma et al. |
| 6,091,953 A | 7/2000 | Ho et al. |
| 6,101,394 A | 8/2000 | Illidge |
| 6,111,857 A | 8/2000 | Soliman et al. |
| 6,112,089 A | 8/2000 | Satarasinghe |
| 6,119,024 A | 9/2000 | Takayama |
| 6,122,513 A | 9/2000 | Bassirat |
| 6,151,512 A | 11/2000 | Chheda et al. |
| 6,167,036 A | 12/2000 | Beven |
| 6,178,328 B1 | 1/2001 | Tang et al. |
| 6,192,246 B1 | 2/2001 | Satarasinghe |
| 6,198,719 B1 | 3/2001 | Faruque et al. |
| 6,198,910 B1 | 3/2001 | Hanley |
| 6,208,615 B1 | 3/2001 | Faruque et al. |
| 6,219,539 B1 | 4/2001 | Basu et al. |
| 6,223,047 B1 | 4/2001 | Ericsson |
| 6,233,247 B1 | 5/2001 | Alami et al. |
| 6,246,674 B1 | 6/2001 | Feuerstein et al. |
| 6,252,862 B1 | 6/2001 | Sauer et al. |
| 6,256,300 B1 | 7/2001 | Ahmed et al. |
| 6,266,529 B1 | 7/2001 | Chheda |
| 6,272,148 B1 | 8/2001 | Takagi et al. |
| 6,285,875 B1 | 9/2001 | Alajoki et al. |
| 6,289,220 B1 | 9/2001 | Spear |
| 6,320,898 B1 | 11/2001 | Newson et al. |
| 6,345,185 B1 | 2/2002 | Yoon et al. |
| 6,366,961 B1 | 4/2002 | Subbiah et al. |
| 6,370,357 B1 | 4/2002 | Xiao et al. |
| 6,370,381 B1 | 4/2002 | Minnick et al. |
| 6,393,482 B1 | 5/2002 | Rai et al. |
| 6,400,712 B1 | 6/2002 | Phillips |
| 6,404,754 B1 | 6/2002 | Lim |
| 6,408,182 B1 | 6/2002 | Davidson et al. |
| 6,418,306 B1 | 7/2002 | McConnell |
| 6,424,834 B1 | 7/2002 | Chang et al. |
| 6,430,168 B1 | 8/2002 | Djurkovic et al. |
| 6,438,370 B1 | 8/2002 | Einola et al. |
| 6,438,376 B1 | 8/2002 | Elliott et al. |
| 6,438,377 B1 | 8/2002 | Savolainen |
| 6,445,922 B1 | 9/2002 | Hiller et al. |
| 6,459,696 B1 | 10/2002 | Carpenter et al. |
| 6,473,399 B1 | 10/2002 | Johansson et al. |
| 6,477,159 B1 | 11/2002 | Yahagi |
| 6,480,476 B1 | 11/2002 | Willars |
| 6,480,718 B1 | 11/2002 | Tse |
| 6,507,741 B1 | 1/2003 | Bassirat |
| 6,522,885 B1 | 2/2003 | Tang et al. |
| 6,539,030 B1 | 3/2003 | Bender et al. |
| 6,542,481 B2 | 4/2003 | Foore et al. |
| 6,542,752 B1 | 4/2003 | Illidge |
| 6,545,984 B1 | 4/2003 | Simmons |
| 6,560,453 B1 | 5/2003 | Henry et al. |
| 6,580,699 B1 | 6/2003 | Manning et al. |
| 6,590,879 B1 | 7/2003 | Huang et al. |
| 6,611,695 B1 | 8/2003 | Periyalwar |
| 6,618,585 B1 | 9/2003 | Robinson et al. |
| 6,621,811 B1 | 9/2003 | Chang et al. |
| 6,628,637 B1 | 9/2003 | Li et al. |
| 6,651,105 B1 | 11/2003 | Bhagwat et al. |
| 6,687,237 B1 | 2/2004 | Lee et al. |
| 6,701,148 B1 | 3/2004 | Carter et al. |
| 6,701,149 B1 | 3/2004 | Bagchi et al. |
| 6,711,144 B1 | 3/2004 | Kim et al. |
| 6,731,618 B1 | 5/2004 | Chung et al. |
| 6,738,625 B1 | 5/2004 | Oom et al. |
| 6,741,862 B2 | 5/2004 | Chung et al. |
| 6,754,191 B1 | 6/2004 | Paranchych et al. |
| 6,757,319 B1 | 6/2004 | Parsa et al. |
| 6,768,903 B2 | 7/2004 | Fauconnier et al. |
| 6,771,962 B2 | 8/2004 | Saifullah et al. |
| 6,781,999 B2 | 8/2004 | Eyuboglu et al. |
| 6,813,498 B1 | 11/2004 | Durga et al. |
| 6,826,402 B1 | 11/2004 | Tran |
| 6,834,050 B1 | 12/2004 | Madour et al. |
| 6,842,630 B2 | 1/2005 | Periyalwar |
| 6,847,821 B1 | 1/2005 | Lewis et al. |
| 6,877,104 B1 | 4/2005 | Shimono |
| 6,909,887 B2 | 6/2005 | Fauconnier et al. |
| 6,944,452 B2 | 9/2005 | Coskun et al. |
| 6,975,869 B1 | 12/2005 | Billon |
| 6,996,056 B2 | 2/2006 | Chheda et al. |
| 6,999,784 B1 | 2/2006 | Choi et al. |
| 7,035,636 B1 | 4/2006 | Lim et al. |
| 7,042,858 B1 | 5/2006 | Jia et al. |
| 7,047,009 B2 | 5/2006 | Laroia et al. |
| 7,072,663 B2 | 7/2006 | Ramos et al. |
| 7,079,511 B2 | 7/2006 | Abrol et al. |
| 7,085,251 B2 | 8/2006 | Rezaiifar |
| 7,110,785 B1 | 9/2006 | Paranchych et al. |
| 7,130,626 B2 | 10/2006 | Bender et al. |
| 7,130,668 B2 | 10/2006 | Chang et al. |
| 7,139,575 B1 | 11/2006 | Chen et al. |
| 7,162,247 B2 | 1/2007 | Baba et al. |
| 7,170,871 B2 | 1/2007 | Eyuboglu et al. |
| 7,177,650 B1 | 2/2007 | Reiger et al. |
| 7,200,391 B2 | 4/2007 | Chung et al. |
| 7,212,822 B1 | 5/2007 | Vicharelli et al. |
| 7,236,764 B2 | 6/2007 | Zhang et al. |
| 7,242,958 B2 | 7/2007 | Chung et al. |
| 7,251,491 B2 | 7/2007 | Jha |
| 7,277,446 B1 | 10/2007 | Abi-Nassif et al. |
| 7,298,327 B2 | 11/2007 | Dupray et al. |
| 7,299,168 B2 | 11/2007 | Rappaport et al. |
| 7,299,278 B2 | 11/2007 | Ch'ng |
| 7,349,699 B1 | 3/2008 | Kelly et al. |
| 7,398,087 B1 | 7/2008 | McConnell et al. |
| 7,408,887 B2 | 8/2008 | Sengupta et al. |
| 7,411,996 B2 | 8/2008 | Kim et al. |
| 7,453,912 B2 | 11/2008 | Laroia et al. |
| 7,457,265 B2 | 11/2008 | Julka et al. |
| 7,486,696 B2 | 2/2009 | Garg et al. |
| 7,512,110 B2 | 3/2009 | Sayeedi et al. |
| 7,546,124 B1 | 6/2009 | Tenneti et al. |
| 7,751,835 B2 | 7/2010 | Sharma et al. |
| 7,751,858 B2 | 7/2010 | Chou |
| 8,085,696 B2 | 12/2011 | Garg et al. |
| 8,094,630 B2 | 1/2012 | Garg et al. |
| 8,145,221 B2 | 3/2012 | Garg et al. |
| 8,160,020 B2 | 4/2012 | Eyuboglu et al. |
| 8,195,187 B2 | 6/2012 | Eyuboglu et al. |
| 1993/0057970 | 5/1993 | Willhoff et al. |
| 1996/0019459 | 6/1996 | Graves et al. |
| 1997/0859197 | 5/1997 | Chheda et al. |
| 1998/0036191 | 3/1998 | Sharma et al. |
| 1998/0198387 | 11/1998 | Bevan |
| 1998/0213523 | 12/1998 | Simmons |
| 1998/0217064 | 12/1998 | Xia et al. |
| 1999/0283151 | 4/1999 | Lee et al. |
| 1999/0461454 | 12/1999 | Robinson |
| 2001/0797273 | 3/2001 | Periyalwar et al. |
| 2001/0046863 A1 | 11/2001 | Rinne et al. |
| 2002/0025820 A1 | 2/2002 | Fauconnier et al. |
| 2002/0031107 A1 | 3/2002 | Li et al. |
| 2002/0032034 A1 | 3/2002 | Tiedemann et al. |
| 2002/0035699 A1 | 3/2002 | Crosbie |
| 2002/0067707 A1 | 6/2002 | Morales et al. |
| 2002/0068570 A1 | 6/2002 | Abrol et al. |
| 2002/0082018 A1 | 6/2002 | Coskun et al. |
| 2002/0085719 A1 | 7/2002 | Crosbie |
| 2002/0102976 A1 | 8/2002 | Newbury et al. |
| 2002/0136226 A1 | 9/2002 | Christoffel et al. |
| 2002/0145990 A1 | 10/2002 | Sayeedi |
| 2002/0193110 A1 | 12/2002 | Julka et al. |

(56) References Cited

U.S. PATENT DOCUMENTS

| | | | |
|---|---|---|---|
| 2002/0196749 A1* | 12/2002 | Eyuboglu et al. | 370/328 |
| 2001/0871581 | 1/2003 | Chheda et al. | |
| 2003/0003913 A1 | 1/2003 | Chen et al. | |
| 2003/0438748 | 1/2003 | Zhang et al. | |
| 2003/0026240 A1 | 2/2003 | Eyuboglu et al. | |
| 2003/0031201 A1 | 2/2003 | Choi | |
| 2003/0067970 A1 | 4/2003 | Kim et al. | |
| 2003/0095513 A1 | 5/2003 | Woodmansee et al. | |
| 2003/0100311 A1 | 5/2003 | Chung et al. | |
| 2003/0469105 | 5/2003 | Zhang et al. | |
| 2003/0114162 A1 | 6/2003 | Chheda et al. | |
| 2003/0117948 A1 | 6/2003 | Ton et al. | |
| 2003/0125039 A1 | 7/2003 | Lachtar et al. | |
| 2003/0195016 A1 | 10/2003 | Periyalwar | |
| 2004/0008649 A1 | 1/2004 | Wybenga et al. | |
| 2004/0015607 A1 | 1/2004 | Bender et al. | |
| 2004/0038700 A1 | 2/2004 | Gibbs | |
| 2004/0068668 A1 | 4/2004 | Lor et al. | |
| 2004/0081111 A1 | 4/2004 | Bae et al. | |
| 2004/0179492 A1 | 9/2004 | Zhang et al. | |
| 2004/0203771 A1 | 10/2004 | Chang et al. | |
| 2004/0214574 A1* | 10/2004 | Eyuboglu et al. | 455/439 |
| 2004/0218556 A1 | 11/2004 | Son et al. | |
| 2004/0224687 A1 | 11/2004 | Rajkotia | |
| 2004/0266436 A1 | 12/2004 | Jaakkola et al. | |
| 2005/0021616 A1 | 1/2005 | Rajahalm et al. | |
| 2005/0648187 | 1/2005 | Schmidt et al. | |
| 2005/0025116 A1 | 2/2005 | Chen et al. | |
| 2005/0036504 A1 | 2/2005 | Joshi et al. | |
| 2005/0053034 A1* | 3/2005 | Chiueh | 370/331 |
| 2005/0111429 A1 | 5/2005 | Kim et al. | |
| 2005/0113117 A1 | 5/2005 | Bolin et al. | |
| 2005/0124343 A1 | 6/2005 | Kubo | |
| 2005/0148297 A1 | 7/2005 | Lu et al. | |
| 2005/0181795 A1 | 8/2005 | Mark et al. | |
| 2005/0207368 A1 | 9/2005 | Nam | |
| 2005/0213555 A1 | 9/2005 | Eyuboglu et al. | |
| 2005/0713958 | 9/2005 | Akhtar et al. | |
| 2005/0715281 | 9/2005 | Fong | |
| 2005/0223097 A1 | 10/2005 | Ramsayer et al. | |
| 2005/0233746 A1 | 10/2005 | Laroia et al. | |
| 2005/0728848 | 10/2005 | Novak et al. | |
| 2005/0243749 A1 | 11/2005 | Mehrabanzad et al. | |
| 2005/0245279 A1 | 11/2005 | Mehrabanzad et al. | |
| 2005/0751848 | 12/2005 | Fong | |
| 2006/0758743 | 1/2006 | Novak et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0126554 A1 | 6/2006 | Motegi et al. | |
| 2006/0126556 A1 | 6/2006 | Jiang et al. | |
| 2006/0804343 | 6/2006 | Fong | |
| 2006/0805670 | 6/2006 | Novak et al. | |
| 2006/0146751 A1 | 7/2006 | Obuchi et al. | |
| 2006/0148460 A1 | 7/2006 | Mukherjee et al. | |
| 2006/0159045 A1 | 7/2006 | Ananthaiyer et al. | |
| 2006/0820683 | 7/2006 | Novak et al. | |
| 2006/0820705 | 7/2006 | Novak et al. | |
| 2006/0182063 A1 | 8/2006 | Jia et al. | |
| 2006/0183497 A1 | 8/2006 | Paranchych et al. | |
| 2006/0822018 | 8/2006 | Novak et al. | |
| 2006/0203766 A1 | 9/2006 | Kim et al. | |
| 2006/0209760 A1 | 9/2006 | Saito et al. | |
| 2006/0209882 A1* | 9/2006 | Han et al. | 370/465 |
| 2006/0824848 | 9/2006 | Novak et al. | |
| 2006/0825360 | 9/2006 | Novak et al. | |
| 2006/0240782 A1 | 10/2006 | Pollman et al. | |
| 2006/0828312 | 10/2006 | Novak et al. | |
| 2006/0829426 | 10/2006 | Novak et al. | |
| 2006/0259628 A1 | 11/2006 | Vadlapudi et al. | |
| 2006/0264218 A1 | 11/2006 | Zhang et al. | |
| 2006/0291420 A1* | 12/2006 | Ng | 370/331 |
| 2006/0294214 A1 | 12/2006 | Chou | |
| 2006/0294241 A1 | 12/2006 | Cherian et al. | |
| 2007/0022396 A1* | 1/2007 | Attar et al. | 716/5 |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0099632 A1 | 5/2007 | Choksi | |
| 2007/0105527 A1 | 5/2007 | Nylander et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0153750 A1 | 7/2007 | Baglin et al. | |
| 2007/0155329 A1 | 7/2007 | Mehrabanzad et al. | |
| 2007/0160008 A1 | 7/2007 | Burgess | |
| 2007/0197220 A1 | 8/2007 | Willey | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Rao et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0009328 A1 | 1/2008 | Narasimha | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0070574 A1 | 3/2008 | Vikberg et al. | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2008/0273493 A1 | 11/2008 | Fong et al. | |
| 2008/0287130 A1 | 11/2008 | Laroia et al. | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0103494 A1 | 4/2009 | Jia et al. | |
| 2009/0116445 A1 | 5/2009 | Samar et al. | |
| 2009/0129334 A1 | 5/2009 | Feng et al. | |
| 2009/0156218 A1 | 6/2009 | Garg et al. | |
| 2009/0191878 A1 | 7/2009 | Hedqvist et al. | |
| 2012/0243476 A1 | 9/2012 | Eyuboglu et al. | |

FOREIGN PATENT DOCUMENTS

| | | |
|---|---|---|
| AU | 2001/21976 | 6/2001 |
| AU | 735575 | 7/2001 |
| AU | 2003/202721 | 10/2003 |
| CA | 2295922 | 3/2004 |
| CN | 1265253 | 8/2000 |
| CN | 1653844 | 10/2004 |
| CN | 101015224 A | 8/2007 |
| CN | 101015224 B | 5/2012 |
| EP | 625863 | 11/1994 |
| EP | 0904369 | 3/1999 |
| EP | 983694 | 3/2000 |
| EP | 983705 | 3/2000 |
| EP | 995278 | 4/2000 |
| EP | 995296 | 4/2000 |
| EP | 1005245 | 5/2000 |
| EP | 1011283 | 6/2000 |
| EP | 1014107 | 6/2000 |
| EP | 1397929 | 3/2004 |
| EP | 1491065 | 12/2004 |
| EP | 1751998 | 2/2007 |
| EP | 1896980 | 3/2008 |
| EP | 1897383 | 3/2008 |
| GB | 2447585 | 8/2008 |
| GB | 2452688 | 3/2009 |

(56) References Cited

FOREIGN PATENT DOCUMENTS

| | | |
|---|---|---|
| GB | 2447585 | 10/2010 |
| HK | 1101334 A | 10/2007 |
| JP | 2007-538476 | 12/2007 |
| JP | 2008-547329 | 12/2008 |
| JP | 2008-547358 | 12/2008 |
| JP | 5117188 B2 | 10/2012 |
| KR | 9833373 | 8/1998 |
| KR | 2004/046069 | 6/2004 |
| KR | 2004/089744 | 10/2004 |
| KR | 787289 | 12/2007 |
| MX | 1999/10613 | 3/2002 |
| WO | WO9748191 | 12/1997 |
| WO | WO 98/08353 | 2/1998 |
| WO | WO 98/09460 | 3/1998 |
| WO | WO98/53618 | 11/1998 |
| WO | WO98/53620 | 11/1998 |
| WO | WO99/03245 | 1/1999 |
| WO | WO99/04511 | 1/1999 |
| WO | WO00/60891 | 10/2000 |
| WO | WO01/45308 | 6/2001 |
| WO | WO01/86988 | 11/2001 |
| WO | WO02/071633 | 9/2002 |
| WO | WO02/071652 | 9/2002 |
| WO | WO03/001820 | 1/2003 |
| WO | WO03/009576 | 1/2003 |
| WO | WO 03/043364 | 5/2003 |
| WO | WO03/054721 | 7/2003 |
| WO | WO03/081938 | 10/2003 |
| WO | WO2004/064434 | 7/2004 |
| WO | WO2005/012520 | 12/2005 |
| WO | WO2005/115026 | 12/2005 |
| WO | WO2006/081527 | 8/2006 |
| WO | WO2007/002659 | 1/2007 |
| WO | WO2007/028122 | 3/2007 |
| WO | WO2007/028252 | 3/2007 |
| WO | WO2007/044099 | 4/2007 |
| WO | WO2007/045101 | 4/2007 |
| WO | WO 2007/075446 | 7/2007 |
| WO | WO 2007/078766 | 7/2007 |
| WO | WO2007/078766 | 5/2011 |

OTHER PUBLICATIONS

Paul Bender & Ramin Rezalifar, "Draft Baseline Text for the 1xEV-DO Upper Layers (excluding Physical Layer)", 3GPP2, Aug. 17, 2000.
3GPP2, "3GPP2 Access Network Interfaces Interoperability Specification 2, Release A," Jun. 2000.
TIA/EIA/TSB-115, "Wireless IP Architecture Based on IETF Protocols", Jun. 6, 2000.
3GPP2, "Wireless IP Network Standard", 3rd Generation Partnership Project 2 (3GPP2), Version 1.0.0, Jul. 14, 2000.
Goran Janevski, "IP-Based Mobile Wireless Access Network Architecture", Nortel Networks-MWIF Contribution, Draft dated Sep. 7, 2000.
*International Search Report,* Patent Cooperation Treaty, Apr. 26, 2007, 10 pages.
*International Search Report,* Patent Cooperation Treaty, Oct. 29, 2002, 5 pages.
*International Preliminary Report on Patentability* for Application No. PCT/US2005/017385, Dec. 7, 2006, 8 pages.
*International Preliminary Report on Patentability* for Application No. PCT/US2006/024958, Jan. 17, 2008, 7 pages.
*EP Examination Report* for Application No. 06785637.7, Feb. 6, 2008, 2 pages.
U.S. Appl. No. 09/891,103, filed Jun. 25, 2001.
PCT application No. PCT/US2002/020380 filed on Jun. 25, 2002, with Publication No. WO2003/001820.
U.S. Appl. No. 11/640,619, filed Dec. 18, 2006.
PCT application No. PCT/US2005/17385 filed on May 17, 2005, with Publication No. WO2005/115026.
U.S. Appl. No. 11/037,896, filed Jan. 18, 2005.
U.S. Appl. No. 11/167,785, filed Jun. 27, 2005.
U.S. Appl. No. 11/243,405, filed Oct. 4, 2005.
PCT application No. PCT/US2006/24958 filed on Jun. 27, 2006, with Publication No. WO2007/002659.
U.S. Appl. No. 11/303,773, filed Dec. 16, 2005.
PCT application No. PCT/US2006/47524 filed on Dec. 13, 2006, with Publicaton No. WO2007/075446.
U.S. Appl. No. 11/303,774, filed Dec. 16, 2005.
PCT application No. PCT/US2006/47963 filed on Dec. 15, 2006, with Publication No. WO2007/075446.
U.S. Appl. No. 11/955,644, filed Dec. 13, 2007.
*International Search Report,* Patent Cooperation Treaty, Oct. 26, 2006, 6 pages.
*Written Opinion of the International Searching Authority,* Patent Cooperation Treaty, Oct. 26, 2006, 8 pages.
International Search Report and Written Opinion for PCT international application No. PCT/US2006/25018, mailed Jan. 29, 2008 (11 pages).
International Preliminary Report on Patentability for Application No. PCT/US2006/25018, Mar. 19, 2009 (8 pages).
International Preliminary Report on Patentability for PCT international application No. PCT/US2006/047963, mailed Dec. 11, 2008 (5 pages).
International Search Report and Written Opinion for PCT international application No. PCT/US2006/047963, mailed Sep. 26, 2008 (9 pages).
International Search Report and Written Opinion for PCT international application No. PCT/US2006/047524, mailed May 26, 2009 (13 pages).
U.S. Appl. No. 10/848,597, filed May 18, 2004, now U.S. Patent No. 7,170,871, issued Jan. 30, 2007.
U.S. Appl. No. 11/166,893, filed Jun. 24, 2005.
PCT application No. PCT/US2006/025018 filed on Jun. 26, 2006, with Publication No. WO2007/044099.
U.S. Appl. No. 11/402,744, filed Apr. 12, 2006.
3rd Generation Partnership Project "3GPP2", cdma2000 High Rate Packet Data Interface Specification, C.S0024-A, version 4.0, Oct. 25, 2002.
3rd Generation Partnership Project "3GPP2", cdma2000 High Rate Packet Data Interface Specification, C.S0024-A, version 1.0, Mar. 2004.
3rd Generation Partnership Project "3GPP2", cdma2000 High Rate Packet Data Interface Specification, C.S0024-A, version 2.0, Jul. 2005.
3rd Generation Partnership Project "3GPP2", cdma2000 High Rate Packet Data Interface Specification, C.S0024-B, version 1.0, Apr. 2006.
Rashid Attar et al., "Evolution of cdma2000 Cellular Networks: Multicarrier EV-DO", IEEE Communications Magazine, Mar. 2006. pp. 46-53.
Chinese Office action of Chinese application No. 200580024230.0 mailed Mar. 15, 2009 (13 pages).
EP Examination Report for Application No. 05750705.5, Jan. 9, 2007 (2 pages).
TIA/EIA/IS-2001, Interoperability Specification (IOS) for CDMA2000 Network Access Interfaces, Aug. 2001 (revised version of May 2000).
Office action and response history of U.S. Appl. No. 09/891,103 to May 27, 2009.
Office action and response history of U.S. Appl. No. 10/848,597 to May 18, 2004.
Office action and response history of U.S. Appl. No. 11/166,893 to May 27, 2009.
Office action and response history of U.S. Appl. No. 11/037,896 to May 27, 2009.
Office action and response history of U.S. Appl. No. 11/167,785 to May 27, 2009.
Office action and response history of U.S. Appl. No. 11/243,405 to May 27, 2009.
Office action and response history of U.S. Appl. No. 11/303,773 to May 27, 2009.
Office action and response history of U.S. Appl. No. 11/303,774 to May 27, 2009.

(56) References Cited

OTHER PUBLICATIONS

Office action and response history of U.S. Appl. No. 11/402,744 to May 27, 2009.
Office action and response history of U.S. Appl. No. 11/955,644 to May 27, 2009.
Office action of U.S. Appl. No. 11/303,774 dated Jun. 12, 2009.
Australian (AU) Examination Report for Application No. 2005426813, Jun. 4, 2009 (18 pages).
Office Action and response from European Patent Office for Application No. 06836082.5 mailed Jun. 18, 2009 and sent Jul. 21, 2009 (21 pages).
Chinese Office action response of Chinese application No. 200580024230.0 sent Jul. 22, 2009 (8 pages).
Office action and response history of U.S. Appl. No.. 11/166,893 to Aug. 11, 2009.
Office action and response history of U.S. Appl. No. 11/955,644 to Aug. 11, 2009.
Office action and response history of U.S. Appl. No. 09/891,103 to Aug. 11, 2009.
Office action and response history of U.S. Appl. No. 11/167,785 to Aug. 11, 2009.
Office action and response history of U.S. Appl. No. 11/243,405 to Aug. 11, 2009.
Office action and response history of U.S. Appl. No. 11/303,773 to Aug. 13, 2009.
Office action and response history of U.S. Appl. No. 11/402,744 to Aug. 17, 2009.
Office action and response history of U.S. Appl. No. 11/486,545 to Aug. 26, 2009.
3rd Generation Partnership Project 2 "3GPP2", "cdma2000 High Rate Packet Data Interface Specification", C.S0024, version 2, Oct. 27, 2000 (441 pages).
3rd Generation Partnership Project 2 "3GPP2", "cdma2000 High Rate Packet Data Interface Specification", C.S0024-B, version 2, Mar. 2007 (1627 pages).
Library Search for Nortel and frequency handoff. Search results dated Aug. 28, 2009 (85 pages).
Office action and response history of U.S. Appl. No. 11/037,896 to Sep. 17, 2009.
Office action and response history of U.S. Appl. No. 11/303,774 to Sep. 17, 2009.
Office action and response history of U.S. Appl. No. 11/167,785 to Sep. 22, 2009.
Office action and response history of U.S. Appl. No. 11/243,405 to Sep. 22, 2009.
Office action and response history of U.S. Appl. No. 11/243,405 to Nov. 9, 2009.
Office action and response history of U.S. Appl. No. 11/640,619 to Nov. 9, 2009.
Office action and response history of U.S. Appl. No. 09/891,103 to Nov. 10, 2009.
Office action and response history of U.S. Appl. No. 11/303,773 to Nov. 20, 2009.
Office action and response history of U.S. Appl. No. 11/402,744 to Nov. 30, 2009.
Chinese Office action of Chinese application No. 200580024230.0 mailed Nov. 20, 2009 (4 pages).
Office action and response history of U.S. Appl. No. 11/166,893 to Dec. 8, 2009.
Office action and response history of U.S. Appl. No. 09/891,103 to Dec. 8, 2009.
Office action and response history of U.S. Appl. No. 11/037,896 to Dec. 8, 2009.
Office action and response history of U.S. Appl. No. 11/243,405 to Dec. 8, 2009.
Office action and response history of U.S. Appl. No. 11/955,644 to Dec. 8, 2009.
Office action and response history of U.S. Appl. No. 11/303,774 to Dec. 11, 2009.
Office action and response history of U.S. Appl. No. 11/243,405 to Jan. 6, 2010.
Office action and response history of U.S. Appl. No. 11/037,896 to Jan. 11, 2010.
Office action and response history of U.S. Appl. No. 11/167,785 to Jan. 11, 2010.
Office action and response history of U.S. Appl. No. 09/891,103 to Dec. 13, 2009.
GB Examination Report for Application No. 0811839.0, mailed Jan. 22, 2010 (2 pages).
Office action and response history of U.S. Appl. No. 11/486,545 to Dec. 8, 2009.
USPTO Non Final Office Action in U.S. Appl. No. 11/955,644, dated May 4, 2012, 17 pages.
European Patent Office communication from European application No. 06785637.7 mailed Apr. 27, 2012 (2 pages).
Fish & Richardson, P.C., Response to Notice of Panel Decision from Pre-Appeal Brief Review dated Feb. 23, 2012 in U.S. Appl. No. 11/402,744, filed May 23, 2012, 11 pages.
Final Office Action in U.S. Appl. No. 11/037,896, dated May 24, 2012, 29 pages.
Response to Japanese Office action issued in application No. 2007-527408 on Nov. 11, 2011, mailed Nov. 16, 2011, response filed May 16, 2012 (26 pages).
Fish & Richardson, P.C., Response to Non Final Office Action dated May 4, 2012 in U.S. Appl. No. 11/955,644, filed Aug. 3, 2012, 14 pages.
Fish & Richardson, P.C., Response to Final Office Action dated May 24, 2012 in U.S. Appl. No. 12/857,206, filed Aug. 23, 2012, 17 pages.
Supplemental Search Report from European Application No. 05750705.5 issued Aug. 2, 2012 (102 pages).
Fish & Richardson, P.C., Response to Non Final Office Action dated Jun. 7, 2012 in U.S. Appl. No. 11/167,785, filed Sep. 6, 2012, 11 pages.
Chinese Office action Chinese application No. 200580024230.0 sent Nov. 20, 2009 with English translation (6 pages).
Chinese Office action response of Chinese application No. 200580024230.0 filed Feb. 5, 2010, along with instructions for response and associate recommendation (12 pages).
European Patent Office communication mailed Jun. 18, 2009 and response to Jun. 18, 2009 communication of European application No. 06836082.5 filed Jul. 21, 2009 (21 pages).
Chinese Office action with English translation of Chinese application No. 200580024230.0 dated May 17, 2010 (6 pages).
Response filed May 21, 2010 to GB Examination Report for Application No. 0811839.0, dated Jan. 22, 2010 (12 pages).
GB Examination Report for Application No. 0811839.0, mailed Jun. 3, 2010 (3 pages).
Office action and response history of U.S. Appl. No. 11/640,619 to Jun. 18, 2010.
Fish & Richardson, P.C., Amendment in reply to Action dated Jun. 16, 2010 in U.S. Appl. No. 11/037,896, dated Jun. 28, 2010, 21 pages.
USPTO Advisory Action in U.S. Appl. No. 11/303,774, dated Jun. 30, 2010, 2 pages.
Examiner Interview Summary in U.S. Appl. No. 11/166,893, dated Jun. 30, 2010, 4 pages.
USPTO Notice of Allowance in U.S. Appl. No. 11/486,545, dated Jul. 28, 2010, 8 pages.
Fish & Richardson, P.C., Amendment in Reply to Action dated Mar. 25, 2010 in U.S. Appl. No. 11/166,893, filed Jun. 28, 2010, 19 pages.
Response filed Aug. 9, 2010 to GB Examination Report for Application No. 0811839.0, dated Jun. 3, 2010 (10 pages).
Response filed Aug. 2, 2010 to Chinese office action for Chinese application No. 200580024230.0 dated May 17, 2010 (41 pages).
USPTO Final Office Action in U.S. Appl. No. 11/303,773, dated Aug. 18, 2010, 12 pages.
Fish & Richardson, P.C., Amendment in Reply to Action dated Mar. 30, 2010 in U.S. Appl. No. 11/402,744, filed Aug. 30, 2010, 12 pages.
Notice of Allowance in U.S. Appl. No. 11/303,774, dated Aug. 31, 2010, 4 pages.
USPTO Office Action in U.S. Appl. No. 11/166,893, dated Sep. 2, 2010, 31 pages.

(56) References Cited

OTHER PUBLICATIONS

Fish & Richardson, P.C., Supplemental Amendment in Reply to Action dated Jun. 18, 2010 in U.S. Appl. No. 11/640,619, filed Oct. 18, 2010, 20 pages.
USPTO Final Office Action in U.S. Appl. No. 11/167,785, dated Oct. 15, 2010, 10 pages.
USPTO Supplemental Notice of Allowance in U.S. Appl. No. 09/891,103, dated Oct. 15, 2010, 4 pages.
USPTO Final Office Action in U.S. Appl. No. 11/402,744, dated Nov. 12, 2010, 22 pages.
Supplemental Notice of Allowability in U.S. Appl. No. 11/303,774, dated Nov. 22, 2010, 9 pages.
Notice of Allowability in U.S. Appl. No. 11/486,545, dated Nov. 8, 2010, 6 pages.
Notice of Allowance in U.S. Appl. No. 11/303,774, dated Dec. 21, 2010, 8 pages.
Examiner Interview Summary in U.S. Appl. No. 11/166,893, dated Dec. 17, 2010, 3 pages.
Final Office Action in U.S. Appl. No. 11/640,619, dated Jan. 7, 2011, 24 pages.
Notice of Allowance in U.S. Appl. No. 11/037,896, dated Jan. 5, 2011, 5 pages.
Notice of Allowance in U.S. Appl. No. 11/303,773, dated Dec. 30, 2010, 9 pages.
Fish & Richardson, P.C., Amendment in Reply to Final Office Action dated Nov. 12, 2010 in U.S. Appl. No. 11/402,744, filed Feb. 14, 2011, 12 pages.
Japanese Office action of application No. 2007-527408 issued Nov. 24, 2010, mailed Nov. 29, 2010 with English translation (21 pages).
Fish & Richardson, P.C., Amendment in Reply to Office Action dated Sep. 2, 2010 in U.S. Appl. No. 11/166,893, filed Jan. 3, 2011, 18 pages.
USPTO Notice of Allowance in U.S. Appl. No. 11/166,893, dated Mar. 18, 2011, 21 pages.
Notice of Allowability in U.S. Appl. No. 11/486,545, dated Mar. 11, 2011, 9 pages.
USPTO Supplemental Notice of Allowance in U.S. Appl. No. 09/891,103, dated Mar. 14, 2011, 6 pages.
USPTO Non-Final Office Action in U.S. Appl. No. 11/402,744, dated Apr. 1, 2011, 14 pages.
Notice of Allowance in U.S. Appl. No. 11/303,774, dated Apr. 4, 2011, 7 pages.
Notice of Allowance in U.S. Appl. No. 11/303,773, dated Apr. 15, 2011, 6 pages.
USPTO Supplemental Notice of Allowance in U.S. Appl. No. 11/166,893, dated Apr. 22, 2011, 17 pages.
International Preliminary Report on Patentability for PCT international application No. PCT/US2006/047524, mailed Apr. 28, 2011 (8 pages).
Notice of Allowance in U.S. Appl. No. 11/037,896, dated May 17, 2011, 8 pages.
Response filed May 30, 2011 to Japanese Office action issued in application No. 2007-527408, Nov. 24, 2010, mailed Nov. 29, 2010 (31 pages).
Fish & Richardson, P.C., Amendment in Reply to Office Action dated Apr. 1, 2011 in U.S. Appl. No. 11/402,744, filed Jun. 30, 2011, 13 pages.
USPTO Final Office Action in U.S. Appl. No. 11/402,744, dated Oct. 6, 2011, 14 pages.
Non Final Office Action in U.S. Appl. No. 11/037,896, dated Oct. 20, 2011, 28 pages.
USPTO Notice of Appeal Decision in U.S. Appl. No. 11/167,785, dated May 3, 2011, 2 pages.
Fish & Richardson, P.C., Response to Notice of Appeal Decision dated May 3, 2011 in U.S. Appl. No. 11/167,785, filed Nov. 3, 2011, 13 pages.
Japanese Office action issued in application No. 2007-527408 on Nov. 11, 2011, mailed Nov. 16, 2011 (5 pages).
Fish & Richardson, P.C., Response to Final Office Action dated Oct. 6, 2011 in U.S. Appl. No. 11/402,744, filed Jan. 6, 2012, 13 pages.
Fish & Richardson, P.C., Response to Non Final Office Action dated Oct. 20, 2011 in U.S. Appl. No. 12/857,206, filed Mar. 20, 2012, 19 pages.
USPTO Final Office Action in U.S. Appl. No. 11/955,644, dated Sep. 21, 2012, 22 pages.
Fish & Richardson, P.C., Response to Final Office Action dated Sep. 21, 2012 in U.S. Appl. No. 11/955,644, filed Dec. 20, 2012, 16 pages.
USPTO Non Final Office Action in U.S. Appl. No. 13/430,422, dated Dec. 7, 2012, 6 pages.
USPTO Non Final Office Action in U.S. Appl. No. 11/167,785, dated Dec. 6, 2012, 9 pages.
Fish & Richardson, P.C., Response to Non Final Office Action dated Dec. 7, 2012 in U.S. Appl. No. 13/430,422, filed Mar. 4, 2013, 9 pages.
Fish & Richardson, P.C., Response to Final Office Action dated Dec. 6, 2012 in U.S. Appl. No. 11/167,785, filed Mar. 6, 2013, 13 pages.
Examination Report from European Application No. 05750705.5 issued Mar. 11, 2013 (9 pages).
Fish & Richardson, P.C., Amendment After Allowance in U.S. Appl. No. 12/857,206, filed Feb. 21, 2013, 10 pages.
Response to European Patent Office communication from European application No. 06785637.7 mailed Apr. 27, 2012, filed Jun. 24, 2012, 3 pages.
European Search Report from European Application No. 06836082.5 mailed Apr. 26, 2013 (80 pages).
USPTO Final Office Action in U.S. Appl. No. 13/430,422, dated May 31, 2013, 12 pages.
Supplemental European Search Report from European Application No. 06836082.5 mailed May 15, 2013 (1 page).
USPTO Non Final Office Action in U.S. Appl. No. 11/167,785, dated Jun. 13, 2013, 10 pages.

* cited by examiner

RADIO NETWORK CONTROL

CROSS-REFERENCE TO RELATED APPLICATIONS

This application is related to U.S. application Ser. Nos. 11/037,896 filed on Jan. 18, 2005, 09/891,103, filed on Jun. 25, 2001, 10/848,597, filed on May 18, 2004, and 11/243,405, filed on Oct. 4, 2005, all of which are incorporated herein by reference.

This application is also related to U.S. application Ser. No. 11/303,773, titled "Radio Frequency Dragging Prevention," and U.S. application Ser. No. 11/303,774, titled "Radio Network Communication," being filed concurrently with the present application, which are also incorporated herein by reference.

TECHNICAL FIELD

This invention relates to radio network control.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1x) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TLA/EIA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

An EVolution of the current 1xRTT standard for high-speed data-only (DO) services, also known as the 1xEV-DO protocol has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, but has yet not been adopted. Revision A is also incorporated herein by reference.

FIG. 1 shows a 1xEV-DO radio access network 100 with radio node controllers 102 and 104 connected to radio nodes 108, 110, 112, 114, 116, 118 over a packet network 122. The packet network 122 can be implemented as an IP-based network that supports many-to-many connectivity between the radio nodes and the radio node controllers. The packet network is connected to the Internet 124 via a packet data serving node (PDSN) 106. Other radio nodes, radio node controllers, and packet networks (not shown in FIG. 1) can be included in the radio access network. The packet network 122 may be several distinct networks connecting individual radio node controllers to their associated radio nodes, or it may be a single network as shown in FIG. 1, or a combination.

Typically, each radio node controller controls 25-100 radio nodes and each radio node supports 1-4 carriers each of 1.25 MHz of bandwidth. A carrier is a band of radio frequencies used to establish airlinks with access terminals. The geographic area of the radio access network that is served by any given radio node is referred to as a cell. Each cell can be divided into multiple sectors (typically 3 or 6) by using multiple sectorized antennas (the term "sector" is used both conventionally and in this document, however, even when there is only one sector per cell).

Access terminals 120 communicate with the network 100 over airlinks 126. Each access terminal may be a laptop computer, a Personal Digital Assistant (PDA), a dual-mode voice/data handset, or another device, with built-in 1xEV-DO Rev-0 or Rev-A support. The airlink 126 between the network 100 and an access terminal 120 includes a control channel over which a serving radio node controller (i.e., the radio node controller on which a 1xEV-DO session of the access terminal 120) transmits messages and parameters that the access terminal 120 may need for access and paging operations. The messages and parameters (collectively referred to in this description as "control channel messages") convey system parameters, access parameters, neighbor lists, paging messages, and channel assignment information to the access terminal 120.

Access terminals 120 periodically send route update messages to the network 100. Each route update message identifies the sectors that are "visible" to the access terminal 120. The visible sectors may include sectors of radio nodes that are not controlled by the access terminal's serving radio node controller.

When a packet destined for an access terminal 120 is received at the serving radio node controller 102, the serving radio node controller 102 selects a set of sectors on which the access terminal 120 is to be paged, and sends a paging message to the selected sectors over respective control channels. One selection method known as "flood paging" involves selecting the sectors of all of the radio nodes that are controlled by the access terminal's serving radio node controller. Another selection method known as "selective paging" involves selecting only the visible sectors (or a subset of the visible sectors) of radio nodes that are controlled by the access terminal's serving radio node controller.

In a scenario in which the access terminal is located at or near the border of two sectors, both of which are visible to the access terminal but only sector A is controlled by the access terminal's serving radio node controller, the network is limited to sending paging messages, UATI_Assignment messages, and/or TrafficChannelAssignment messages to the access terminal over the control channel of the single sector A.

In a scenario in which an active access terminal crosses over the border between two sectors that are on different carriers and/or subnets, an inter-carrier and/or inter-subnet hard handoff is performed between the radio node controller's controlling the radio nodes associated with the two sectors. The user disruption associated with such hard handoffs are generally in the order of 5-10 seconds.

In both scenarios, lower success rates are generally associated with the activities (e.g., paging, UATI assignment, traffic channel assignment, and hard handoffs) that take place when an access terminal is located at or near a carrier and/or subnet boundary.

SUMMARY

In general, in one aspect, the radio node controller of one subnet sends a communication to an access terminal over a control channel through the infrastructure of another subnet. Implementations may include one or more of the following features: The communication comprises packets. The infrastructure includes a radio node controller. The access terminal is in an idle state. The communication sent over the control channel comprises a paging message, UATI_Assignment message, or TrafficChannelAssignment message. The access terminal notifies the radio node controller of sectors that are visible to the access terminal. The access terminal notifies the radio node controller of information about pilot strengths of sectors that are visible to the access terminal. The notification sent by the access terminal is sent as a route update message. The radio node controller determines, based on the pilot strengths, to which sectors to send a communication over the control channel to the access terminal. The radio node controller sends a communication to the access terminal over a control channel via sectors chosen based on their pilot signal strengths as reported by the access terminal, where at least one chosen sector is located in a different subnet than the radio node controller.

In general, in one aspect, the radio node controller maintains an open traffic channel with an access terminal when the access terminal moves from a coverage area of the first subnet to a coverage area of the second subnet and when the access terminal uses a carrier in the first subnet that cannot be used in the second subnet.

Implementations may include one or more of the following features: Each of the carriers comprises an operating frequency. The radio nodes in the first subnet are configured in accordance with one 1xEV-DO standard and radio nodes in the second subnet are configured in accordance with another 1xEV-DO standard. The radio nodes in the first subnet are configured in accordance with the 1xEV-DO Rev-A standard and radio nodes in the second subnet are configured in accordance with the 1xEV-DO Rev-0 standard.

In general, in one aspect, in a radio access network including a first and a second subnet, in which the first subnet includes both a first radio node controller and radio nodes that are configured in accordance with one 1EV-DO standard and the second subnet includes radio nodes configured in accordance with another 1xEV-DO standard, the first radio node controller maintains an open traffic channel with an access terminal when the access terminal moves from the coverage area of the first subnet to the coverage area of the second subnet.

Implementations may include the following feature: The radio nodes of the first subnet are configured in accordance with the 1xEV-DO Rev-A standard and the radio nodes of the second subnet are configured in accordance with the 1xEV-DO Rev-0 standard.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
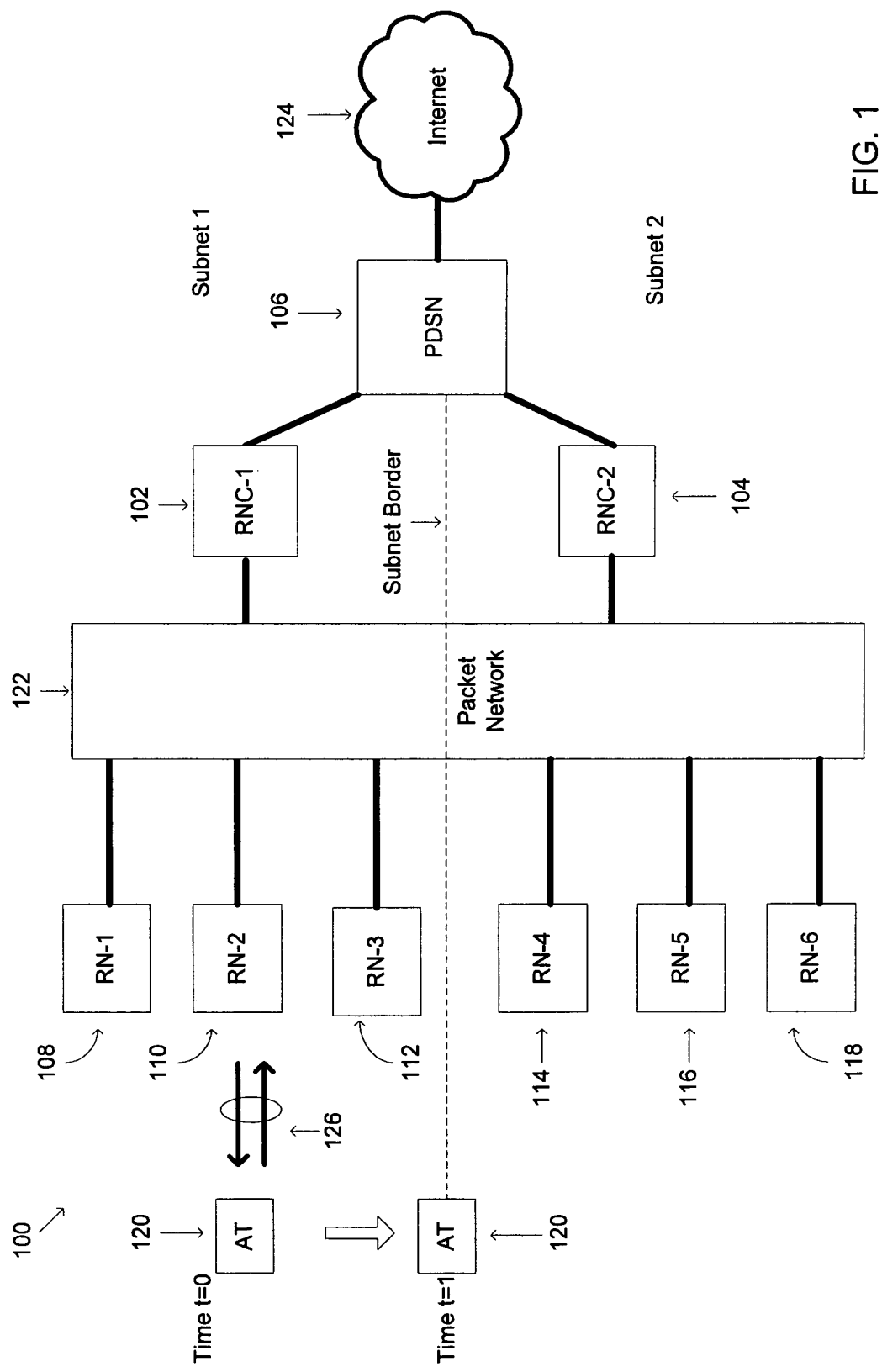
FIGS. 1-3 each show a radio access network.

In the illustrated example of FIG. 1, the network 100 is divided into two 1xEV-DO subnets, each having a radio node controller 102, 104 and three radio nodes 108-118.

Each radio node has a primary association with the radio node controller in its subnet and may have a secondary association with a radio node controller in another subnet. Generally, when a radio node has a primary association with a radio node controller, messages can be exchanged over the forward and reverse traffic channels, the control channel, and the access channel. When a radio node has a secondary association with a radio node controller, messages can only be exchanged over the forward and reverse traffic channels. That is, no messages are exchanged over the access and control channels. Additional information concerning the primary and secondary associations between radio nodes and radio node controllers are described in U.S. application Ser. No. 11/037,896 filed on Jan. 18, 2005, Ser. No. 09/891,103, filed on Jun. 25, 2001, and Ser. No. 10/848,597, filed on May 18, 2004, and incorporated by reference.

In some implementations, the network operator further configures the radio node controllers to have a border association with certain radio nodes in another subnet. Typically, the radio nodes with which a radio node controller has a border association are geographically located at or near the subnet boundaries. The border association concept extends the secondary association concept by enabling a radio node controller to exchange messages over the control channel with radio nodes of another subnet without passing through another radio node controller.

As an example, suppose the network operator configures the radio node controller RNC-1 102 to have a primary association with the radio nodes RN-1 108, RN-2 110, RN-3 112, and a border association with the radio node RN-4 114. An idle access terminal moving within the coverage areas of the radio nodes RN-1, RN-2, RN-3 sends route update messages to the radio node controller RNC-1 to identify the sectors that are visible to the access terminal 120, and for each visible sector, its associated pilot strength. In instances in which the idle access terminal is in the coverage area of the radio node RN-3, the last sent route update message will likely identify, as visible, one or more sectors associated with the radio node RN-4. The sector identification and the relative pilot strengths enable the radio access network to keep track of the access terminal's approximate location within the footprint of the network.

When a packet destined for the idle access terminal 120 is received at the radio node controller RNC-1, the radio node controller RNC-1 uses the last sent route update message to select a set of sectors on which the idle access terminal 120 is to be paged. In some implementations, the radio node controller RNC-1 sends a paging message to the idle access terminal 120 over the control channel of each of the radio nodes with visible sectors. In some implementations, the radio node controller RNC-1 examines the pilot strengths of the visible sectors, identifies those visible sectors associated with the relatively stronger pilot strengths, and sends a paging message to the idle access terminal 120 over the control channel of each of the radio nodes with the identified visible sectors.

In those instances in which the selected set of sectors includes sectors of the radio node RN-4 with which the radio node controller RNC-1 has a border association 130 relationship, a paging message can be sent from the radio node controller RNC-1 to the radio node RN-4 over the control channel. By enabling the idle access terminal 120 to be paged on the sectors associated with the radio node RN-4 as well as those associated with the radio node RN-3, the radio node controller RNC-1 increases the likelihood of receiving a page response from the access terminal 120. In so doing, the network enhances paging reachability for access terminals located at or near the subnet border, which in turn results in a higher page response success rate.

In other examples, rather than sending a paging message only to those sectors identified as visible in the last sent route update message, the radio node controller RNC-1 can be implemented to select a subset of the sectors of its subnet or adjoining subnet in accordance with the distance-based selective techniques described in U.S. application Ser. No. 11/243,405 filed on Oct. 4, 2005, and incorporated by reference, and send the paging message over the control channel of each of the radio nodes associated with the selected subset of sectors.

In other examples, rather than use the last sent route update message to select a set of sectors on which the idle access terminal 120 is to be paged, the radio node controller RNC-1 can be implemented to send a paging message over the control channel of each of the radio nodes with which the radio node controller RNC-1 has a border association. Such a subnet-wide paging technique also enhances the page response success rate for access terminals located at or near the subnet border.

In addition to enhancing paging reachability, the border association concept can be implemented to enhance control channel messaging reliability overall. As an example, an access terminal 120 in the coverage area of the radio node RN-3 can send a UATI_Request or a ConnectionRequest message over access channels of the radio node RN-3. Typically, the UATI_Request or ConnectionRequest message is accompanied by a route update message, which may include, as visible, the sectors of the radio node RN-4 if the access terminal is at or near the subnet boundary. The messages are forwarded by the radio node RN-3 to the radio node controller RNC-1, which processes the request and generates a UATI_Assignment or TrafficChannelAssignment message as appropriate. The radio node controller RNC-1 then sends the UATI_Assignment or TrafficChannelAssignment message to the access terminal over the control channel of each of the visible sectors including those of the radio node RN-4. In those instances in which the access terminal is at or near the subnet boundary, delivery of the UATI_Assignment or TrafficChannelAssignment message over the control channels of the sectors of the radio node RN-4 increases the likelihood of the access terminal receiving the message, thus enabling the network to achieve a higher A13 dormant handoff or connection setup success rate.

Figure 2:
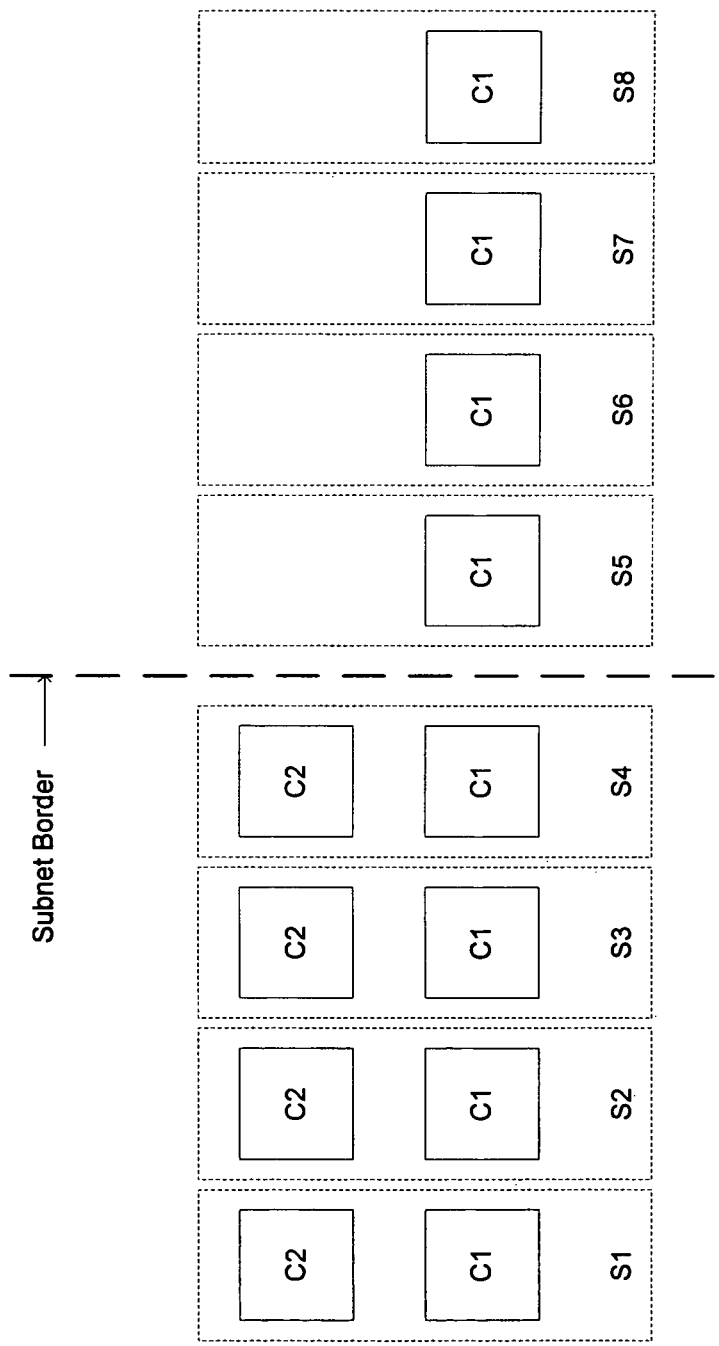
Figure 3:
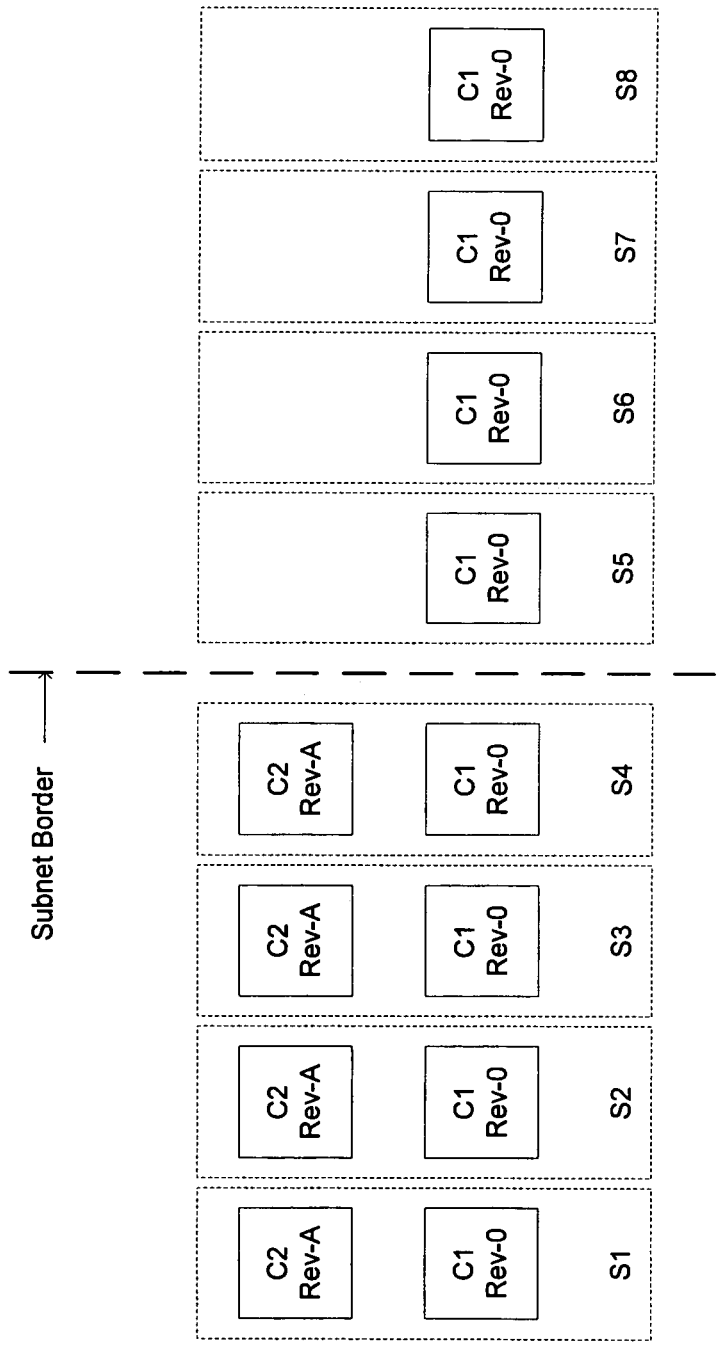

In some implementations, the radio node controllers of the 1EV-DO network 100 of FIG. 1 support multi-carrier sectors. FIG. 2 shows a network coverage area with two carriers C1 and C2, where C1 operates in the sectors S1-S8 of both subnets 1 and 2, and C2 operates only in the sectors S1-S4 of subnet 1. In some implementations, the radio node controllers of the 1xEV-DO network 100 of FIG. 1 support multi-carrier, multi-revision sectors. FIG. 3 shows a network coverage area with two carriers C1 and C2, where C1 operates in the sectors S1-S8 of both subnets 1 and 2, and C2 operates only in the sectors S1-S4 of subnet 1. The sectors S1-S4 of subnet 1 are served by Rev-A capable radio nodes, and the sectors S5-S8 of subnet 2 are served by Rev-0 capable radio nodes. As 1xEvDO Rev-A is backwards compatible with 1xEvDO Rev-0, Rev-A capable access terminals can operate in either Rev-0 mode or Rev-A mode, depending on whether its serving radio node is Rev-0 or Rev-A capable.

Referring to FIGS. 1, 2 and 3, during network design, the network operator designates the sectors (in this case, sectors S4 and S5) at the subnet boundary as border sectors, configures the radio node RN-2 110 and RN-3 112 (which collectively serve the sectors S1-S4) to have a primary association with the radio node controller RNC-1 102 of subnet 1, and configures the radio node RN-4 114 (which serves sector S5) to have a secondary association with the radio node controller RNC-1 102 of subnet 1.

As an active access terminal 120 operating on carrier C2 moves within the coverage area of the subnet 1, the access terminal 120 periodically sends route update messages to the serving radio node controller RNC-1 102 to identify the sectors that are visible to the access terminal 120. For each visible sector, the access terminal 120 provides its associated pilot strength. When serving radio node controller RNC-1 102 detects that the pilot strength associated with the border sector S5 is stronger than the other pilot strengths being reported, the serving radio node controller RNC-1 102 sends a TrafficChannelAssignment message to the access terminal 120. Upon receipt of the message, the access terminal 120 processes the TrafficChannelAssignment message to change the carrier on which it operates to the carrier specified in the TrafficChannelAssignment message. In this case, the access terminal will operate on carrier C1 after the TrafficChannelAssignment message is processed. If the access terminal has any data to send, the access terminal will send it through RNC-1 on carrier C1. This can be done with no interruption in service for the access terminal.

In another implementation, a Connection Close message and a Unicast Redirect message can be used in place of the TrafficChannelAssignment message. When serving radio node controller RNC-1 102 detects that the pilot strength associated with the border sector S5 is stronger than the other pilot strengths being reported, the serving radio node controller RNC-1 102 sends a Connection Close message and a Unicast Redirect message to the access terminal 120. Upon receipt of the message, the access terminal 120 first processes the Connection Close message to close the connection, and then processes the Unicast Redirect message to change the carrier on which it operates to the carrier specified in the Unicast Redirect message. In this case, the access terminal will operate on carrier C1 after the Unicast Redirect message is processed. If the access terminal has any data to send, the access terminal will initiate another connection request on the carrier C1 and the serving radio node controller RNC-1 will establish an active traffic channel by allocating traffic channel resources on the carrier C1. The user disruption associated with the "close connection-switch carrier-open connection" process typically averages about 1 second long.

If the active access terminal crosses the subnet boundary into the coverage area of the sector S5, the secondary association established between the radio node RN-4 114 (which serves the sector S5) and the radio node controller RNC-1 102 enables the user activity (e.g., phone call, data transfer) to continue uninterrupted as the radio node controller RNC-1 102 remains the serving radio node controller for the traffic channel operating on the carrier C1.

If the access terminal 120 moves back into the coverage area of the sector S4 of the subnet 1, the access terminal 120 will continue to operate on the carrier C1. If, however, the access terminal 120 moves further into subnet 2, for example, into the coverage area of the sector S5 which the radio node controller RNC-1 102 has no relationship with and therefore no control over, a hard handoff between the radio node controllers RNC-1 102 and RNC-2 104 is triggered.

The techniques described with reference to FIGS. 2 and 3 improve network reliability by minimizing the number of dropped data connections that may occur when an active access terminal crosses over a subnet boundary into a coverage area of a sector operating on a different carrier and/or 1xEV-DO revision. Further, the techniques reduce the number of hard handoffs that are performed by the network by limiting those hard handoff instances to scenarios in which the access terminal has moved deep into the coverage area of a subnet (i.e., not at or near the subnet boundary). In so doing, network resources that would be tied up with the hard handoffs are made available for use by other components of the network.

Although the techniques described above employ the 1xEV-DO air interface standard, the techniques are also applicable to other CDMA and non-CDMA air interface technologies in which secondary associations and border associations can be established between radio nodes and radio node controllers.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention, and, accordingly, other embodiments are within the scope of the following claims.

What is claimed is:

1. A method performed in a first radio network controller of a first subnet of a radio access network, the method comprising:
   establishing a border association between the first radio network controller and a radio node of a second subnet, the border association being established based at least in part on a proximity of the radio node to a subnet boundary between the first subnet and the second subnet; and
   after the border association has been established, sending a communication to an access terminal over a control channel through the radio node of the second subnet without the communication passing through any radio network controller of the second subnet.

2. The method of claim 1, wherein the communication comprises packets.

3. The method of claim 1, further comprising:
   configuring the first radio network controller to have a border association with at least one radio node of the second subnet, the at least one radio node comprising the radio node.

4. The method of claim 1, wherein the access terminal is in an idle state at least during the communication.

5. The method of claim 1, wherein the communication sent over the control channel comprises a paging message.

6. The method of claim 1, wherein the communication sent over the control channel comprises a UATI_Assignment message.

7. The method of claim 1, wherein the communication sent over the control channel comprises a TrafficChannelAssignment message.

8. The method of claim 1, further comprising:
   receiving a notification from the access terminal at the first radio network controller, the notification comprising information identifying sectors that are visible to the access terminal.

9. The method of claim 8, wherein the notification comprises a route update message.

10. The method of claim 1, further comprising:
    receiving a notification from the access terminal at the first radio network controller, the notification comprising information about pilot strengths of sectors that are visible to the access terminal.

11. The method of claim 10, further comprising:
    determining, based on the pilot strengths, at least one sector to send the communication over the control channel to the access terminal.

12. A method performed in a first radio network controller of a first subnet of a radio access network, the method comprising:
    establishing a border association between the first radio network controller and at least one sector of a radio node of a second subnet, the border association being established based at least in part on a proximity of the radio node to a subnet boundary between the first subnet and the second subnet;
    receiving a notification from an access terminal, the notification comprising information about pilot strengths of sectors that are visible to the access terminal;
    selecting one or more of the sectors based on the information about the pilot strengths, wherein a first sector of the one or more sectors is located in the second subnet of the radio access network and has a border association with the first radio network controller; and
    after the border association has been established, sending a communication to the access terminal over a control channel through the first sector without the communication passing through any radio network controller of the second subnet.

13. A method performed at a first radio network controller of a first subnet of a radio access network, comprising:
establishing a border association between the first radio network controller and a radio node of a second subnet, the border association being established based at least in part on a proximity of the radio node to a subnet boundary between the first subnet and the second subnet; and
after the border association has been established, maintaining an open traffic channel with an access terminal when the access terminal moves from a coverage area of the first subnet to a coverage area of the radio node of the second subnet of the radio access network;
wherein the access terminal initially uses a first carrier in the first subnet that cannot be used in the second subnet.

14. The method of claim 13, wherein the first carrier comprises an operating frequency; and
wherein the first carrier operates in the first subnet and a second carrier operates in the first and second subnets.

15. The method of claim 13, wherein radio nodes of the first subnet are configured in accordance with a first 1xEV-DO standard and radio nodes of the second subnet are configured in accordance with a second 1xEV-DO standard.

16. The method of claim 15, wherein the first 1xEV-DO standard comprises the 1xEV-DO Rev-A standard and the second 1xEV-DO standard comprises the 1xEV-DO Rev-0 standard.

17. A method, comprising:
establishing a border association between the first radio network controller and a radio node of a second subnet, the border association being established based at least in part on a proximity of the radio node to a subnet boundary between the first subnet and the second subnet; and
after the border association has been established, maintaining, at a first radio network controller of a first subnet of a radio access network, an open traffic channel with an access terminal when the access terminal moves from a coverage area of the first subnet to a coverage area of a second subnet of the radio access network;
wherein the first subnet comprises radio nodes that are configured in accordance with a first 1xEV-DO standard and the second subnet comprises radio nodes that are configured in accordance with a second 1xEV-DO standard.

18. The method of claim 17, wherein the first 1xEV-DO standard comprises the 1xEV-DO Rev-A standard and the second 1xEV-DO standard comprises the 1xEV-DO Rev-0 standard.

19. A radio network controller configured to operate in a first subnet of a radio access network, the radio network controller comprising:
a processor; and
memory for storing instructions that are executable by the processor to:
establish a border association between the radio network controller and a radio node of a second subnet, the border association being established based at least in part on a proximity of the radio node to a subnet boundary between the first subnet and the second subnet; and
after the border association has been established, send a communication, from the radio network controller of the first subnet of the radio access network, to an access terminal over a control channel through the second subnet of the radio access network without the communication passing through any radio network controller of the second subnet.

20. The radio network controller of claim 19, wherein the instructions comprise instructions that are executable by the processor to:
receive a notification from the access terminal, the notification comprising information identifying sectors that are visible to the access terminal.

21. The radio network controller of claim 19, wherein the instructions comprise instructions that are executable by the processor to:
receive a notification from the access terminal, the notification comprising information about pilot strengths of sectors that are visible to the access terminal.

22. The radio network controller of claim 21, wherein the instructions comprise instructions that are executable by the processor to:
determine, based on the pilot strengths, at least one sector to send the communication over the control channel to the access terminal.

23. A radio network controller configured to operate in a first subnet of a radio access network, the radio network controller comprising:
a processor; and
memory for storing instructions that are executable by the processor to:
establish a border association between the first radio network controller and at least one sector of a radio node of a second subnet, the border association being established based at least in part on a proximity of the radio node to a subnet boundary between the first subnet and the second subnet;
receive a notification from an access terminal at the first radio network controller of a first subnet of a radio access network, the notification comprising information about pilot strengths of sectors that are visible to the access terminal;
select one or more of the sectors based on the information about the pilot strengths, wherein a first sector of the one or more sectors is located in the second subnet of the radio access network and has a border association with the first radio network controller; and
after the border association has been established, send a communication to the access terminal over a control channel through the first sector without the communication passing through any radio network controller of the second subnet.

24. A radio network controller configured to operate in a first subnet of a radio access network, the radio network controller comprising:
means for establishing a border association between the radio network controller and a radio node of a second subnet, the border association being established based at least in part on a proximity of the radio node to a subnet boundary between the first subnet and the second subnet; and
means for sending a communication, after the border association has been established, from the radio network controller of the first subnet, to an access terminal over a control channel through the radio node of the second subnet without the communication passing through any radio network controller of the second subnet.

25. The radio network controller of claim 24, further comprising:
means for receiving a notification from the access terminal, the notification comprising information identifying sectors that are visible to the access terminal.

26. The radio network controller of claim 24, further comprising:
means for receiving a notification from the access terminal, the notification comprising information about pilot strengths of sectors that are visible to the access terminal.

27. The radio network controller of claim 26, further comprising:
means for determining, based on the pilot strengths, at least one sector to send the communication over the control channel to the access terminal.

28. A radio network controller configured to operate in a first subnet of a radio access network, the radio network controller comprising:
means for establishing a border association between the first radio network controller and at least one sector of a radio node of a second subnet, the border association being established based at least in part on a proximity of the radio node to a subnet boundary between the first subnet and the second subnet;
means for receiving a notification from an access terminal at the first radio network controller of a first subnet of a radio access network, the notification comprising information about pilot strengths of sectors that are visible to the access terminal;
means for selecting one or more of the sectors based on the information about the pilot strengths, wherein a first sector of the one or more sectors is located in the second subnet of the radio access network and has a border association with the first radio network controller; and
means for sending, after the border association has been established, a communication to the access terminal over a control channel through the first sector without the communication passing through any radio network controller of the second subnet.

29. A system, comprising:
a first subnet of a radio access network and a second subnet of a radio access network, the first subnet comprising:
a first radio network controller configured to:
establish a border association between the radio network controller and a radio node of a second subnet, the border association being established based at least in part on a proximity of the radio node to a subnet boundary between the first subnet and the second subnet; and
after the border association has been established, send a communication, from the radio network controller of the first subnet of the radio access network, to an access terminal over a control channel through the second subnet of the radio access network without the communication passing through any radio network controller of the second subnet.

30. The system of claim 29, wherein the first radio network controller is configured to receive a notification from the access terminal, the notification comprising information identifying sectors that are visible to the access terminal.

31. The system of claim 29, wherein the first radio network controller is configured to receive a notification from the access terminal, the notification comprising information about pilot strengths of sectors that are visible to the access terminal.

32. The system of claim 31, wherein the first radio network controller is configured to determine, based on the pilot strength, at least one sector to send the communication over the control channel to the access terminal.

33. The system of claim 29, further comprising:
a packet data serving node connected to a network, wherein the first radio network controller is connected to the packet data serving node, and wherein the at least one radio node is connected to the first radio network controller.

34. The system of claim 29, further comprising:
the second subnet of the radio access network, comprising:
the radio node, the radio node being configured to communicate with a second radio network controller; and
the second radio network controller, wherein the second radio network controller is configured to send a second communication to a second access terminal over a second control channel through a second radio node of the at least one radio node of the first subnet of the radio access network without the communication passing through any radio network controller of the first subnet.

35. A system, comprising:
a first subnet of a radio access network and a second subnet of the radio access network, the first subnet comprising:
a first radio network controller configured to:
establish a border association between the first radio network controller and at least one sector of a radio node of a second subnet, the border association being established based at least in part on a proximity of the radio node to a subnet boundary between the first subnet and the second subnet;
receive a notification from an access terminal at the first radio network controller, the notification comprising information about pilot strengths of sectors that are visible to the access terminal;
select one or more of the sectors based on the information about the pilot strengths, wherein a first sector of the one or more sectors is located in the second subnet of the radio access network and has a border association with the first radio network controller; and
after the border association has been established, send a communication to the access terminal over a control channel the first sector without the communication passing through any radio network controller of the second subnet.

36. A radio network controller configured to operated in a first subnet of a radio access network, the radio network controller comprising:
a processor; and
memory for storing instructions that are executable by the processor to:
establish a border association between the first radio network controller and a radio node of a second subnet, the border association being established based at least in part on a proximity of the radio node to a subnet boundary between the first subnet and the second subnet; and
after the border association has been established, maintain, at the radio network controller of a first subnet of a radio access network, an open traffic channel with an access terminal when the access terminal moves from a coverage area of the first subnet to a coverage area of the radio node of the second subnet of the radio access network;
wherein the access terminal initially uses a first carrier in the first subnet that cannot be used in the second subnet.

37. The radio network controller of claim 36, wherein the first carrier comprises an operating frequency; and
wherein the first carrier operates in the first subnet and a second carrier operates in the first and second subnets.

38. The radio network controller of claim 36, wherein radio nodes of the first subnet are configured in accordance with a first 1xEV-DO standard and radio nodes of the second subnet are configured in accordance with a second 1xEV-DO standard.

39. The radio network controller of claim 38, wherein the first 1xEV-DO standard comprises the 1xEV-DO Rev-A standard and the second 1xEV-DO standard comprises the 1xEV-DO Rev-0 standard.

40. A radio network controller configured to operate in a first subnet of a radio access network, the radio network controller comprising:
means for establishing a border association between the first radio network controller and a radio node of a second subnet, the border association being established based at least in part on a proximity of the radio node to a subnet boundary between the first subnet and the second subnet; and
means for maintaining, at the radio network controller after the border association has been established, an open traffic channel with an access terminal when the access terminal moves from a coverage area of the first subnet to a coverage area of the radio node of the second subnet of the radio access network;
wherein the access terminal initially uses a first carrier in the first subnet that cannot be used in the second subnet.

41. The radio network controller of claim 40, wherein the first carrier comprises an operating frequency; and
wherein the first carrier operates in the first subnet and a second carrier operates in the first and second subnets.

42. The radio network controller of claim 40, wherein radio nodes of the first subnet are configured in accordance with a first 1xEV-DO standard and radio nodes of the second subnet are configured in accordance with a second 1xEV-DO standard.

43. The radio network controller of claim 42, wherein the first 1xEV-DO standard comprises the 1xEV-DO Rev-A standard and the second 1xEV-DO standard comprises the 1xEV-DO Rev-0 standard.

44. A system, comprising:
a first subnet of a radio access network, comprising:
a first radio network controller, wherein the first radio network controller is configured to:
establish a border association between the first radio network controller and a radio node of a second subnet, the border association being established based at least in part on a proximity of the radio node to a subnet boundary between the first subnet and the second subnet; and
after the border association has been established, maintain an open traffic channel with an access terminal when the access terminal moves from a coverage area of the first subnet to a coverage area of the radio rode of the second subnet of the radio access network;
wherein the access terminal initially uses a first carrier in the first subnet that cannot be used in the second subnet.

45. The system of claim 44, wherein the first carrier comprises an operating frequency; and
wherein the first carrier operates in the first subnet and a second carrier operates in the first and second subnets.

46. The system of claim 44, wherein radio nodes of the first subnet are configured in accordance with a first 1xEV-DO standard and radio nodes of the second subnet are configured in accordance with a second 1xEV-DO standard.

47. The system of claim 46, wherein the first 1xEV-DO standard comprises the 1xEV-DO Rev-A standard and the second 1xEV-DO standard comprises the 1xEV-DO Rev-0 standard.

48. The system of claim 44, further comprising:
a packet data serving node connected to a network, wherein the first radio network controller is connected to the packet data serving node; and
wherein the first subnet further comprises:
at least one radio node configured to communicate with the first radio network controller, wherein the at least one radio node is connected to the first radio network controller.

49. A radio network controller configured to operate in a first subnet of a radio access network, the radio network controller comprising:
a processor; and
memory for storing instructions that are executable by the processor to:
establish a border association with a radio node of a second subnet, the border association being established based at least in part on a proximity of the radio node to a subnet boundary between the first subnet and the second subnet; and
after the border association has been established, maintain, at the radio network controller, an open traffic channel with an access terminal when the access terminal moves from a coverage area of the first subnet to a coverage area of the radio node of the second subnet of the radio access network;
wherein the first subnet comprises radio nodes that are configured in accordance with a first 1xEV-DO standard and the second subnet comprises radio nodes that are configured in accordance with a second 1xEV-DO standard.

50. The radio network controller of claim 49, wherein the first 1xEV-DO standard comprises the 1xEV-DO Rev-A standard and the second 1xEV-DO standard comprises the 1xEV-DO Rev-0 standard.

51. A radio network controller configured to operated in a first subnet of a radio access network, the radio network controller comprising:
means for establishing a border association between the first radio network controller and a radio node of a second subnet, the border association being established based at least in part on a proximity of the radio node to a subnet boundary between the first subnet and the second subnet; and
means for maintaining, after the border association has been established, an open traffic channel with an access terminal when the access terminal moves from a coverage area of the first subnet to a coverage area of the radio node of the second subnet of the radio access network;
wherein the first subnet comprises radio nodes that are configured in accordance with a first 1xEV-DO standard and the second subnet comprises radio nodes that are configured in accordance with a second 1xEV-DO standard.

52. The radio network controller of claim 51, wherein the first 1xEV-DO standard comprises the 1xEV-DO Rev-A standard and the second 1xEV-DO standard comprises the 1xEV-DO Rev-0 standard.

53. A system, comprising:

a first subnet of a radio access network, comprising:
- radio nodes, wherein at least one radio node of the radio nodes is configured to communicate with a first radio network controller; and
- the first radio network controller, wherein the first radio network controller is configured to:
  - establish a border association between the first radio network controller and at least one sector of a radio node of a second subnet, the border association being established based at least in part on a proximity of the radio node to a subnet boundary between the first subnet and the second subnet; and
  - after the border association has been established, maintain an open traffic channel with an access terminal when the access terminal moves from a coverage area of the first subnet to a coverage area of the radio node of the second subnet of the radio access network;
- wherein the radio nodes of the first subnet comprise at least some radio nodes that are configured in accordance with a first 1xEV-DO standard and the second subnet comprises radio nodes that are configured in accordance with a second 1xEV-DO standard.

54. The system of claim 53, wherein the first 1xEV-DO standard comprises the 1xEV-DO Rev-A standard and the second 1xEV-DO standard comprises the 1xEV-DO Rev-0 standard.

55. A method performed in a radio access network including a first and a second subnet, in which the first subnet includes a first radio network controller, and in which radio nodes in the first subnet are configured in accordance with one 1xEV-DO standard that comprises the 1xEV-DO Rev-A standard, and radio nodes in the second subnet are configured in accordance with another 1xEV-DO standard that comprises the 1xEV-DO Rev-0 standard, the method comprising:
- establishing a border association between the first radio network controller and at least one border radio node of a second subnet, the border association being established based at least in part on a proximity of the border radio node to a subnet boundary between the first subnet and the second subnet; and
- after the border association has been established, enabling the first radio network controller to maintain an open traffic channel with an access terminal when the access terminal moves from a coverage area of the first subnet to a coverage area of the border radio node of the second subnet;
- wherein the access terminal uses a carrier in the first subnet that cannot be used in the second subnet.

56. A method performed in a radio access network including a first and a second subnet, in which the first subnet includes both a first radio network controller and radio nodes that are configured in accordance with one 1xEV-DO standard that comprises the 1xEV-DO Rev-A standard, and the second subnet includes radio nodes configured in accordance with another 1xEV-DO standard that comprises the 1xEV-DO Rev-0 standard, the method comprising:
- establishing a border association between the first radio network controller and at least one border radio node of a second subnet, the border association being established based at least in part on a proximity of the border radio node to a subnet boundary between the first subnet and the second subnet; and
- after the border association has been established, enabling the first radio network controller to maintain an open traffic channel with an access terminal when the access terminal moves from the coverage area of the first subnet to the coverage area of the border radio node of the second subnet.

57. A radio network controller configured to operate in a first subnet of a radio access network, the radio network controller comprising:
- means for establishing a border association between the radio network controller and a radio node of a second subnet, the border association being established based at least in part on a proximity of the radio node to a subnet boundary between the first subnet and the second subnet; and
- means for maintaining, after the border association has been established, an open traffic channel with an access terminal when the access terminal moves from a coverage area of a first subnet to a coverage area of the radio node of the second subnet;
- wherein radio nodes in the first subnet are configured in accordance with a 1xEV-DO standard that comprises the 1xEV-DO Rev-A standard, and radio nodes in the second subnet are configured in accordance with another 1xEV-DO standard that comprises the 1xEV-DO Rev. 0 standard.

58. A system comprising, a packet data serving node connected to a network;
at least two subnets, each subnet comprising:
- at least one radio network controller connected to the packet data serving node; and
- at least one radio node connected to a radio network controller in the same subnet;

wherein a first radio network controller located in a first subnet is configured to:
- establish a border association between the first radio network controller and a border radio node of a second subnet, the border association being established based at least in part on a proximity of the border radio node to a subnet boundary between the first subnet and the second subnet; and
- maintain, after the border association has been established, an open traffic channel with an access terminal when the access terminal moves from a coverage area of a first subnet to a coverage area of the border radio node of the second subnet;

wherein radio nodes in the first subnet are configured in accordance with a 1xEV-DO standard that comprises the 1xEV-DO Rev-A standard, and radio nodes in the second subnet are configured in accordance with another 1xEV-DO standard that comprises the 1xEV-DO Rev. 0 standard.

* * * * *